Aug. 1, 1939.　　　C. C. CADDEN　　　2,167,971
APPARATUS FOR COILING STRIP MATERIAL
Filed Feb. 26, 1936
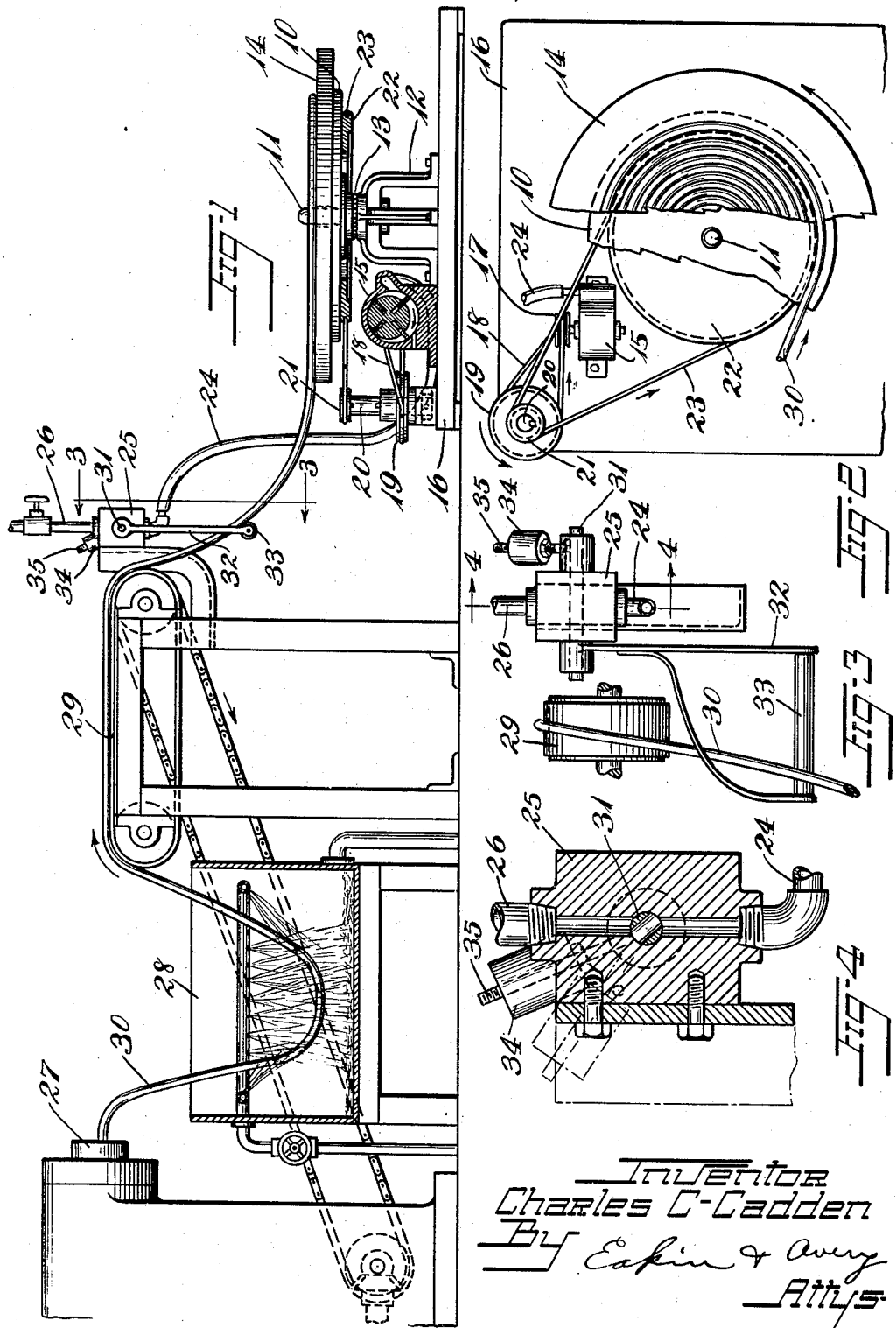
Inventor
Charles C. Cadden
By Eakin & Avery
Attys.

Patented Aug. 1, 1939

2,167,971

UNITED STATES PATENT OFFICE 2,167,971

APPARATUS FOR COILING STRIP MATERIAL

Charles C. Cadden, Akron, Ohio, assignor to The B. F. Goodrich Company, New York, N. Y., a corporation of New York Application February 26, 1936, Serial No. 65,829

4 Claims. (Cl. 242—83)

This invention relates to apparatus for coiling strip material.

In the rubber industry, it is customary to produce long lengths of rubber tubing and strips of various cross-sectional shape by extruding the plastic rubber composition. The extruded material is sprayed or dusted with substances adapted to diminish the adhesive character of the surface of the strips and the strips are then coiled spirally on round pans. The pans with the coiled material are then placed in vulcanizers where the strips are vulcanized. The velocity of the extruded material varies with the plasticity of the composition and the feed of the extruding machine. The pans are usually mounted to rotate horizontally on a turn table and it is obvious that the velocity of the turn table must be greater when the strip is being laid near its center than when the strip is being laid near its periphery. Heretofore such turn tables have been rotated by hand and have required a skilled operator to control their movements without unduly stretching the plastic strip.

The principal objects of the present invention are to provide automatic control of the turn table to prevent stretching of the strip, and to provide simplicity and efficiency of operation.

Other objects will appear from the following description and the accompanying drawing.

Of the drawing:

Fig. 1 is a side elevation of the preferred form of the invention, the spray tank and air motor being partly broken away and partly shown in section to illustrate their construction, and part of the extruding machine being also broken away.

Fig. 2 is a plan view of the turn table and its drive with a pan in place thereon, parts of the turn table and pan being broken away to show the drive mechanism.

Fig. 3 is an enlarged detail view taken on line 3—3 of Fig. 1 to show the throttle and its operating element.

Fig. 4 is a cross-sectional view taken on line 4—4 of Fig. 3.

Referring to the drawing, the numeral 10 designates the turn table, which is freely mounted on a vertical shaft 11 supported by a bracket 12. A ball bearing thrust element 13 is provided to relieve friction. The pan 14 for receiving the coiled strip has a central opening through which the shaft 11 projects. The pan is frictionally held on the turn table.

To provide for driving the turn table an air motor 15 is mounted on the base 16 to which bracket 12 is fixed. A drive pulley 17 on the motor shaft is connected by a quarter turn belt 18 to a pulley 19 on a counter shaft 20. A pulley 21 fixed to the shaft 20 drives a pulley 22 fixed to the turn-table through a belt 23. Motor 15 receives a supply of compressed air through a pipe 24 which connects through a throttle valve 25 with a supply line 26.

The strip material may be produced in any desired manner. In the drawing it is shown as issuing from an extruding machine 27 through a spray tank 28 and on a conveyor 29, the strip being designated by the numeral 30.

In order to regulate the speed of the turn table, the throttle valve 25, which is of the plug valve type, has a plug 31 rotatably extending therethrough. A depending lever 32 is fixed to the plug and supports a laterally disposed roller 33 in the path of the strip. The strip 30 is passed thereover as it extends in a reach between the conveyor 29 and the turn table. A counterweight 34 is fixed to an arm 35 also fixed to the plug. The arrangement is such that with the strip 30 out of contact with the roller 33, the counterweight 34 and arm 32 will balance the plug valve in closed position. When, however, the arm 32 is moved to the left (see Figs. 1 and 4), as by pressure of a reach of the strip 30, the valve is opened and admits air to the air motor to drive the turn-table. Should more slack develop in the reach of strip between the conveyor and the turn table, the throttle will be opened wider thereby and increase the speed of the turn table. Should the table revolve too fast, lifting of the reach of strip slows or stops the motor.

I claim:

1. Apparatus for handling flexible strip material, said apparatus comprising means for winding the strip material, means for feeding the strip material to the winding means, and means for varying the speed of said winding means and feeding means one with relation to the other, the speed-varying means comprising a control element therefor operable by pressure of the strip material against it to effect a change in speed by said speed-varying means, said element being positioned so as to support a reach of the strip material between the feeding means and the winding means when the reach contacts the element so that the element will not exert tension on the material.

2. Apparatus for handling flexible strip material, said apparatus comprising means for winding the strip material, means for feeding the strip material to the winding means, and means for varying the speed of said winding means, the speed-varying means comprising a control element therefor operable by pressure of the strip material against it to effect a change in speed by said speed-varying means, said element being positioned so as to support a reach of the strip material between the feeding means and the winding means when the reach contacts the element so that the element will not exert tension on the material.

3. Apparatus for handling flexible, low tensile strength strip material, said apparatus comprising feeding means and winding means for progressively delivering the strip material free from tension, said winding means including a rotatable support and means for rotating the same, and means controlled by the position of the reach of the strip material between the feeding means and the rotatable support for regulating the speed of said rotating means, the speed-regulating means comprising a rockable control element operable by pressure of the strip material against it to effect a change in speed by said speed-regulating means and positioned so as to support said reach of the material when the reach contacts the element so that the element will not exert tension on the material.

4. Apparatus for handling low tensile strength flexible strip material, said apparatus comprising means for progressively forming the strip material, means for winding the strip material as it is formed, and means for coordinating the speeds of the forming means and the winding means, the coordinating means comprising a motor for driving the winding means and a control element therefor positioned to support at least partially a reach of the strip material between the forming means and the winding means and movable in response to changes in the length of the material in said reach to control the speed of the motor.

CHARLES C. CADDEN.